Patented Mar. 6, 1928.

1,661,998

UNITED STATES PATENT OFFICE.

CLARENCE M. CARSON, OF AKRON, OHIO, ASSIGNOR TO THE GOODYEAR TIRE & RUBBER COMPANY, OF AKRON, OHIO, A CORPORATION OF OHIO.

METHOD OF PREPARING DITHIAZYL DISULPHIDE.

No Drawing.  Application filed September 7, 1926.  Serial No. 134,141.

My invention relates to the manufacture of sulphur containing organic derivatives and it has particular relation to a method of preparing disulphide compounds.

The object of my invention is to provide a method of preparing materials having the above noted characteristics which requires inexpensive raw materials that will react to give a high yield of pure product.

A further object of my invention is to provide a method of preparation which involves a reaction requiring simple equipment.

Among other uses for disulphide compounds, such as thiazyl-disulphides, is that of an accelerator of vulcanization of rubber. In this capacity, materials are incorporated in a rubber mix alone or together with amino bodies, where they interact, not only to hasten the vulcanizing process but to impart desirable physical properties to the product.

Heretofore, such materials have been prepared by causing the corresponding mercaptan to interact with iodine in an alcoholic or alkaline solution. This procedure is undesirable, however, because of the prohibitive cost of the solvents and iodine. Another method which has been employed involves fluxing the mercaptan with sulphur. This method likewise has been found wanting in that the equilibrium of the reaction is not entirely favorable and many by-products result.

I have discovered that the sulphides of the thiophenols, amido thiophenols, thiazoles and the like may be prepared conveniently and inexpensively by oxidizing the mercaptan or its salt with a sulphur chloride. The reaction may be represented as follows:

The sulphur and hydrogen-chloride by-products are readily separated.

An application of these principles to the manufacture of mercaptobenzothiazyl disulphide from mercaptobenzothiazole as the specific mercaptan is represented by the following reaction:

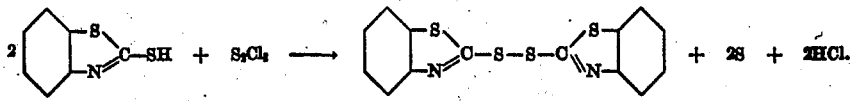

By reason of the fact that sulphur chloride decomposes readily in the presence of moisture, carbon tetra-chloride or any other suitable non-aqueous liquid should be employed as a reacting medium. The acid by-product is removed in any convenient manner; for example, by passing air through the solution if it is of a non-aqueous character or by causing it to react with a base. The sulphur on the other hand may be separated from the disulphide by dissolving the latter in a non-solvent of sulphur. Benzene or carbon bisulphide will be found well adapted for this purpose. The resultant product is a crystalline material which melts at about 175° and is of remarkable purity.

By practising my invention a high yield of the desired product may be obtained, which is relatively pure and easily recrystallized, without resorting to expensive equipment or costly raw materials. While there is described but a single specific embodiment of the principles of my invention, it will be apparent that it permits of broad application and I desire, therefore, that it be limited only to accord with the prior art and the appended claims.

What I claim is:

1. A method of preparing disulphides of mercaptothiazoles that comprises treating the corresponding mercaptothiazole with sulphur chloride.

2. A method of preparing a dibenzothiazyl disulphide that comprises treating mercaptobenzothiazole with sulphur chloride.

3. A method of preparing diarylthiazyl disulphides that comprises treating a mercapto arylthiazole with sulphur chloride.

In witness whereof, I have hereunto signed my name.

CLARENCE M. CARSON.